R. L. Webb,

Twine Holder.

No. 109,979. Patented Dec. 6, 1870.

Witnesses:
C. Wahlers
E. Bilhuber.

Inventor:
R. L. Webb
per
Van Santvoord & Hauff
Attys

UNITED STATES PATENT OFFICE.

RODOLPHUS L. WEBB, OF NEW BRITAIN, CONNECTICUT.

IMPROVEMENT IN TWINE-HOLDERS.

Specification forming part of Letters Patent No. 109,979, dated December 6, 1870.

*To all whom it may concern:*

Be it known that I, RODOLPHUS L. WEBB, of New Britain, in the county of Hartford and State of Connecticut, have invented a new and useful Improvement in Twine-Holders; and I do hereby declare the following to be a full, clear, and exact description thereof, which will enable those skilled in the art to make and use the same, reference being had to the accompanying drawings, forming part of this specification, in which drawings—

Figure 1:
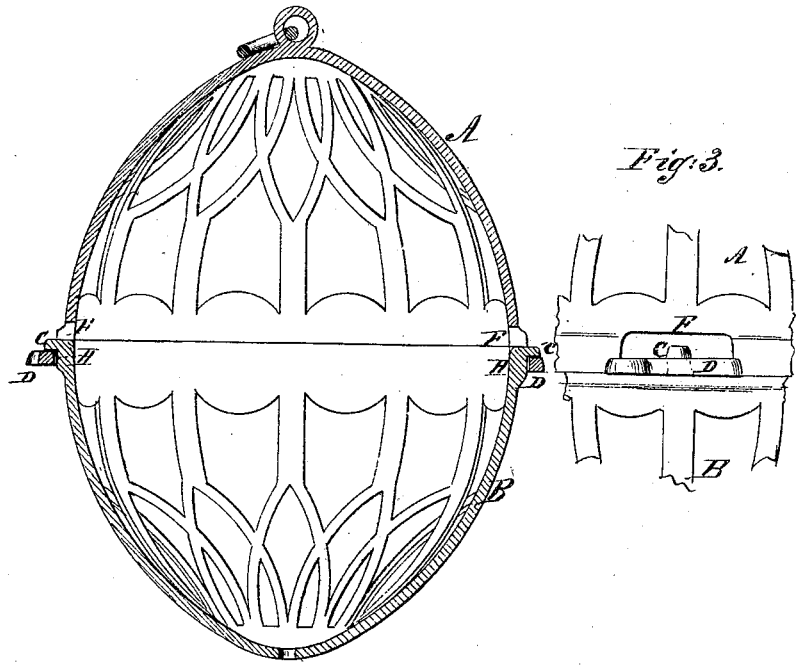
Figure 3:
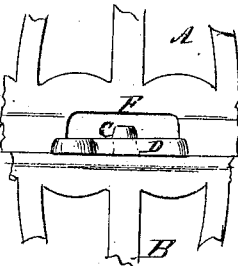
Figure 2:
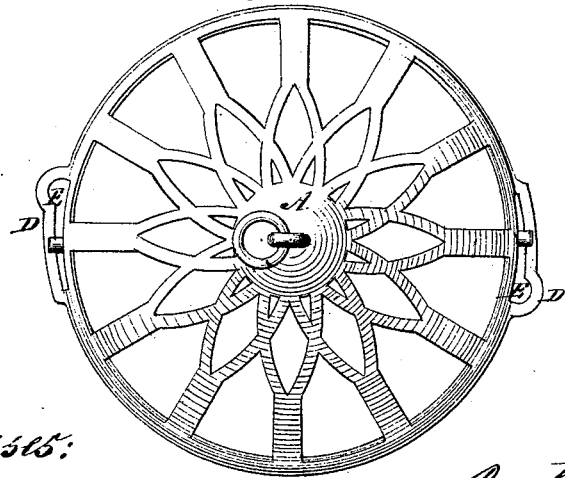

Figure 1 is a vertical section of my improvement. Fig. 2 is a top or plan view thereof. Fig. 3 is an outside view of a portion of the holder, showing the fastening device.

Similar letters indicate corresponding parts.

This invention consists in an improved mode of fastening the divisions of the holder to each other, whereby hooked lugs, formed at the edge of one division, at points opposite to each other, are caused to hook over cam-like ears, which are formed at corresponding positions at the edge of the other division, the ears being partially separated from the edge by elongated slots, which are enlarged at one end, so as to admit the hooked lugs and allow them to hook upon the top or upper surface of the ears, upon which they slide when the divisions are turned upon each other in opposite directions. The upper surfaces of the ears are inclined so as to form cams, and consequently a binding action takes place between the hooks and ears when the two divisions of the holder are turned upon each other in opposite directions. The hooks fulfill the double office of connecting the divisions, and, in combination with the inclined ears, of tightening the connection between them.

The letters A B designate the divisions of a twine-holder whose sides are made of open-work, so as to permit the twine to run out between any of the bars, and so to expose the ball of twine to view. The divisions A B fit together with a rabbeted joint, so as to bring their outer edges flush with each other. On opposite points of the edge of division B, I form hooked lugs C, which extend outward and fit over ears D, which are formed at corresponding parts of the edge of the other division, A. The ears, between their ends, are separated from the edge of division A by elongated slots E, into which the lugs are inserted when the divisions are fastened together, and in order to admit the hooked ends of the lugs one end of each slot is enlarged in an outward direction, so as to permit the corresponding hook to enter and hook over the ear in a position to slide upon it when the divisions A B are turned upon each other, and the edges of division A are cut away, so as to form an opening, F, opposite each ear, in order to give room for the lugs. The surfaces of the ears upon which the hooks of the lugs fasten are inclined at an angle with the joint of the divisions, so as to form cams, and consequently when the divisions A B, after the hooks are passed above the ears, are turned upon each other, the said divisions are firmly fastened to each other by the cam-like action of those parts. The ears project beyond the hooked ends of the lugs for the purpose of preventing the lugs from being loosened or displaced by contact with other objects, and the top of the division A is provided with a suspension-ring, to enable the holder to be suspended in any suitable position. If desired, the bottom of division B can be formed with a base, so that it can stand upright.

I combine with the fastening above described an additional fastening between the exterior of the lugs at G, below their hooks and the inner edges of the ears F, by making those edges of the ears eccentric from the enlargements of the slots E toward their opposite ends, as is shown in Figs. 2 and 3, whereby, when the divisions A B are turned upon each other, the lugs and the ears are likewise tightened upon each other. This arrangement can be used independently, and without giving an inclination to the top of the ears, or in combination therewith.

What I claim as new, and desire to secure by Letters Patent, is—

The combination, with the divisions A B of a twine-holder, of the hooked lugs C, with the slotted inclined ears D, substantially as described.

RODOLPHUS L. WEBB.

Witnesses:
AUSTIN HUNT,
L. G. ROSSETTER.